May 9, 1967  R. F. CROOK  3,318,139
MULTI-DEGREE-OF-FREEDOM FORCE TRANSMITTING STRUCTURE
Filed Sept. 15, 1964  2 Sheets-Sheet 1

INVENTOR
RICHARD F. CROOK
BY
Byerly, Townsend, Watson & Churchill
ATTORNEYS.

May 9, 1967 R. F. CROOK 3,318,139
MULTI-DEGREE-OF-FREEDOM FORCE TRANSMITTING STRUCTURE
Filed Sept. 15, 1964 2 Sheets-Sheet 2

INVENTOR
RICHARD F. CROOK
BY
*Byerly, Townsend, Watson & Churchill*
ATTORNEYS.

United States Patent Office 3,318,139
Patented May 9, 1967

---

3,318,139
MULTI-DEGREE-OF-FREEDOM FORCE TRANSMITTING STRUCTURE
Richard F. Crook, East Haven, Conn., assignor to Textron Electronics, Inc., Providence, R.I., a corporation of Delaware
Filed Sept. 15, 1964, Ser. No. 396,618
6 Claims. (Cl. 73—71.6)

The present invention relates to vibration exciting apparatus and particularly to apparatus for imparting motion to a test specimen in a plurality of directions simultaneously.

A vibration exciter of the type classifiable as a reciprocatory motor, e.g., the conventional electrodynamic shaker, is considered to have a single degree of freedom. That is, it is capable of imparting motion in a single direction, and its moving element is restrained against movement in all other directions. However, structural entities within their normal environment are rarely, if ever, so supported or confined that they vibrate or are caused to vibrate only in a single direction. Since the purpose of vibration testing is to simulate the environment of a test specimen, i.e., a structural component or member, a multi-degree-of-freedom system is a necessity.

Heretofore, equipment has been developed capable of operating at extremely low frequencies, say, below 30 cycles per second and with large amplitudes. In such case relatively appreciable backlash can be tolerated in the linkage between the specimen and the exciters. But, as the upper frequency limit is raised and the amplitude decreased, backlash error becomes more and more significant until it completely masks the signal input.

It is therefore an object of the present invention to provide apparatus which is free from backlash and which is capable of establishing direct and positive connection between a plurality of exciters and a common specimen in a multi-degree-of-freedom system.

In accordance with the invention the mechanical link for joining a specimen mounting table to the moving element of the exciter includes a rigid structural beam member, and a thin walled cylinder sandwiched between the beam member and the table, the cylinder being joined to both the table and the beam member along longitudinal elements of the cylinder in contact with each, the material and construction of the cylinder being such that it behaves as a rigid body for communicating movement between the beam member and the table for all movement in the direction of the cylinder axis, and behaves as a highly compliant flexible body in response to relative movement between the table and the beam member in all other directions.

Generally, the beam members and cylinders will function in parallel pairs joined to each exciter. The invention will be understood better after reading the following detailed description of two exemplary embodiments thereof with reference to the appended drawings in which.

Figure 1:
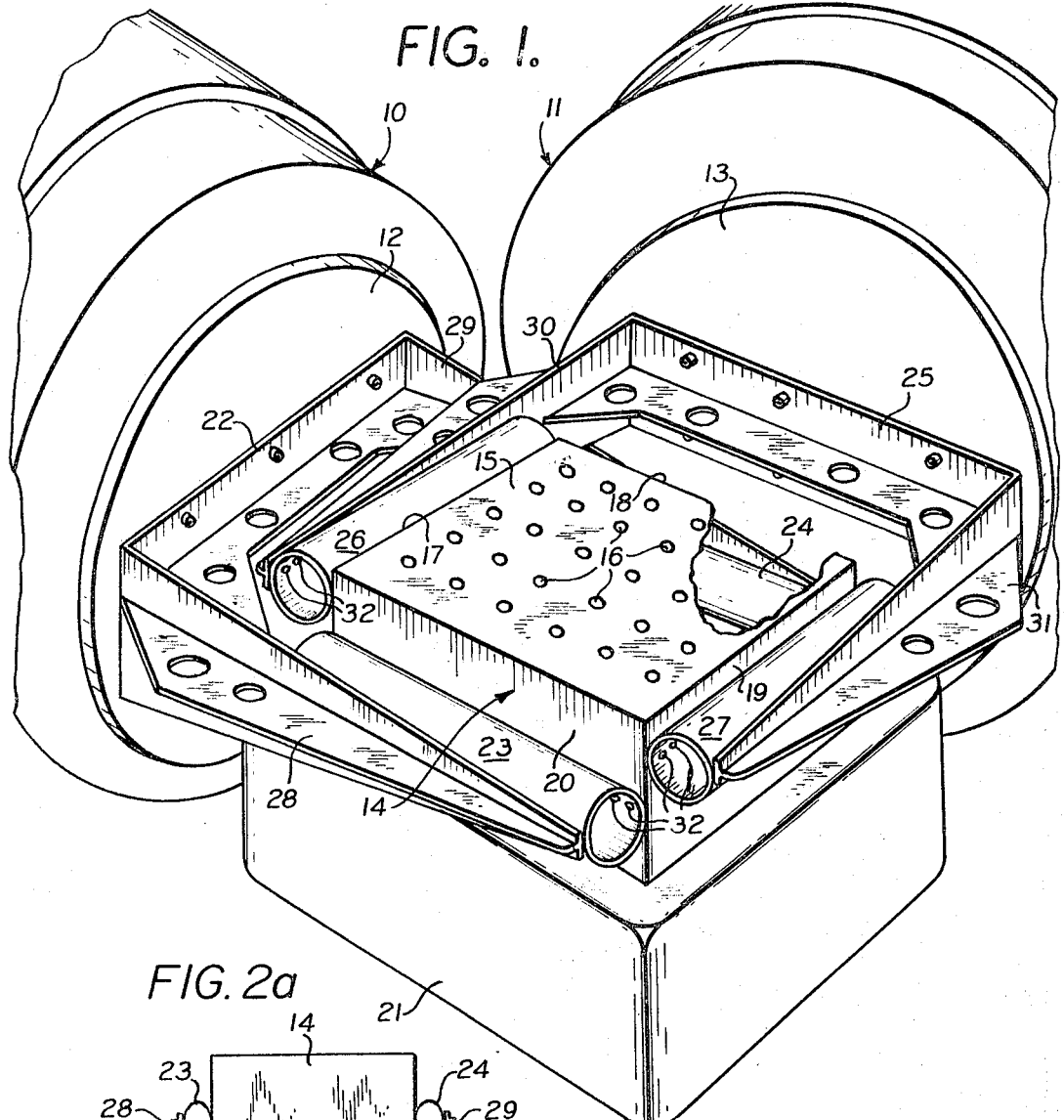
FIGURE 1 is a perspective view of two exciters joined to an auxiliary test table by apparatus embodying the present invention.

Reference should now be had to FIGURE 1 of the drawings wherein two electrodynamic exciters are shown generally at 10 and 11. As is well known, each exciter has a stationary field structure and a movable armature including a table. The tables for exciters 10 and 11 are represented at 12 and 13, respectively, with their excitation axes related orthogonally.

An auxiliary table 14 is provided for mounting the specimen (not shown). In the example, the auxiliary table has a right parallelepiped configuration with an upper face 15 having the usual tapped mounting holes 16 and with sides 17, 18, 19 and 20 for connection to the exciters. If necessary, the auxiliary table 14 may be supported on a slippery table 21, as shown.

The table 12 of exciter 10 is coupled to the auxiliary table 14 by means of a yoke 22 and two thin walled cylinders 23 and 24. Similarly, the table 13 of exciter 11 is joined to table 14 by means of the yoke 25 and the two cylinders 26 and 27. As shown, the two yokes 22 and 25 lie in different planes parallel to the face 15 of the auxiliary table and spaced apart to allow the yokes to extend one over the other. The axes of the yokes are related orthogonally and the arms 28, 29 and 30, 31, respectively, are disposed parallel to the corresponding sides of the auxiliary table. A plurality of rivets or similar fastening elements designated generally by the numeral 32 join each of the cylinders 23, 24, 26 and 27 to both the auxiliary table 14 and the corresponding yoke arm along the elements of the respective cylinder in contact with each.

The cylinders should be constructed such that each behaves as a rigid body for communicating the movement between the yoke arm joined thereto and the auxiliary table for all movement in the direction of the cylinder axis, and behaves as a highly compliant flexible body in response to relative movement between the auxiliary table and the corresponding yoke arm in all other directions. In a typical example, each of the cylinders may have an outside diameter of about 3" and a length of from 12 to 16 inches. The cylinders are constructed by rolling a sheet of thin steel, for example, having a thickness of .010 inch, into a tube of the aforementioned diameter having approximately six layers and, therefore, a total wall thickness of about .060 inch. It is contemplated that the turns or layers of metal in the cylinder will be secured together only along the two elements whereat it is riveted or similarly joined to the auxiliary table and the yoke arm.

It will be recognized that the yoke arms must be reinforced so as to constitute a rigid structural beam member while avoiding excessive weight in any known manner. As shown, the yokes can be constructed separate from the exciter tables to which they are attached by bolts in the usual manner. Hence, the specimen mounting apparatus may be manufactured and sold as a separate entity for use with any pair of exciters.

Figure 2A:
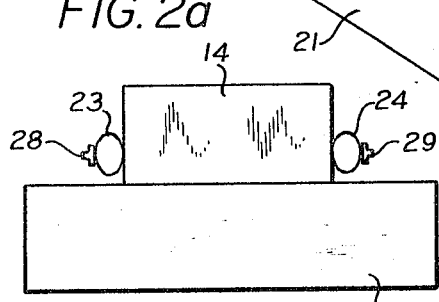
FIGURE 2a is a diagrammatic representation of a portion of the apparatus of FIGURE 1 showing the components in neutral position.
Figure 2B:
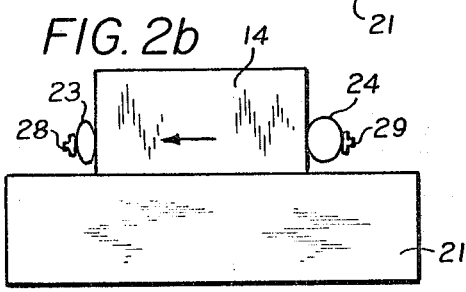
FIGURE 2b is a view similar to FIGURE 2a but showing the auxiliary table displaced in the direction of the arrow.

FIGURES 2a and 2b show the auxiliary table 14 in two different positions on the slippery table 21. Only the arms 28 and 29 and cylinders 23 and 24 are represented. In FIG. 2a the system is shown at rest in its neutral position. That is, the auxiliary table 154 is centered between the yoke arms 28 and 29. The cylinders 23 and 24 are arranged to be compressed slightly such that they assume a slightly elliptical cross section, as shown. FIGURE 2b shows the table 14 displaced in the direction of the arrow. Such displacement results in further compression or squashing of the cylinder 23 while the pressure on the cylinder 24 is relieved and it tends to assume a more circular cross section. It will be understood that by suitably pre-loading the cylinders it is possible to provide a nearly linear spring rate over the range of displacements anticipated.

Figure 3:
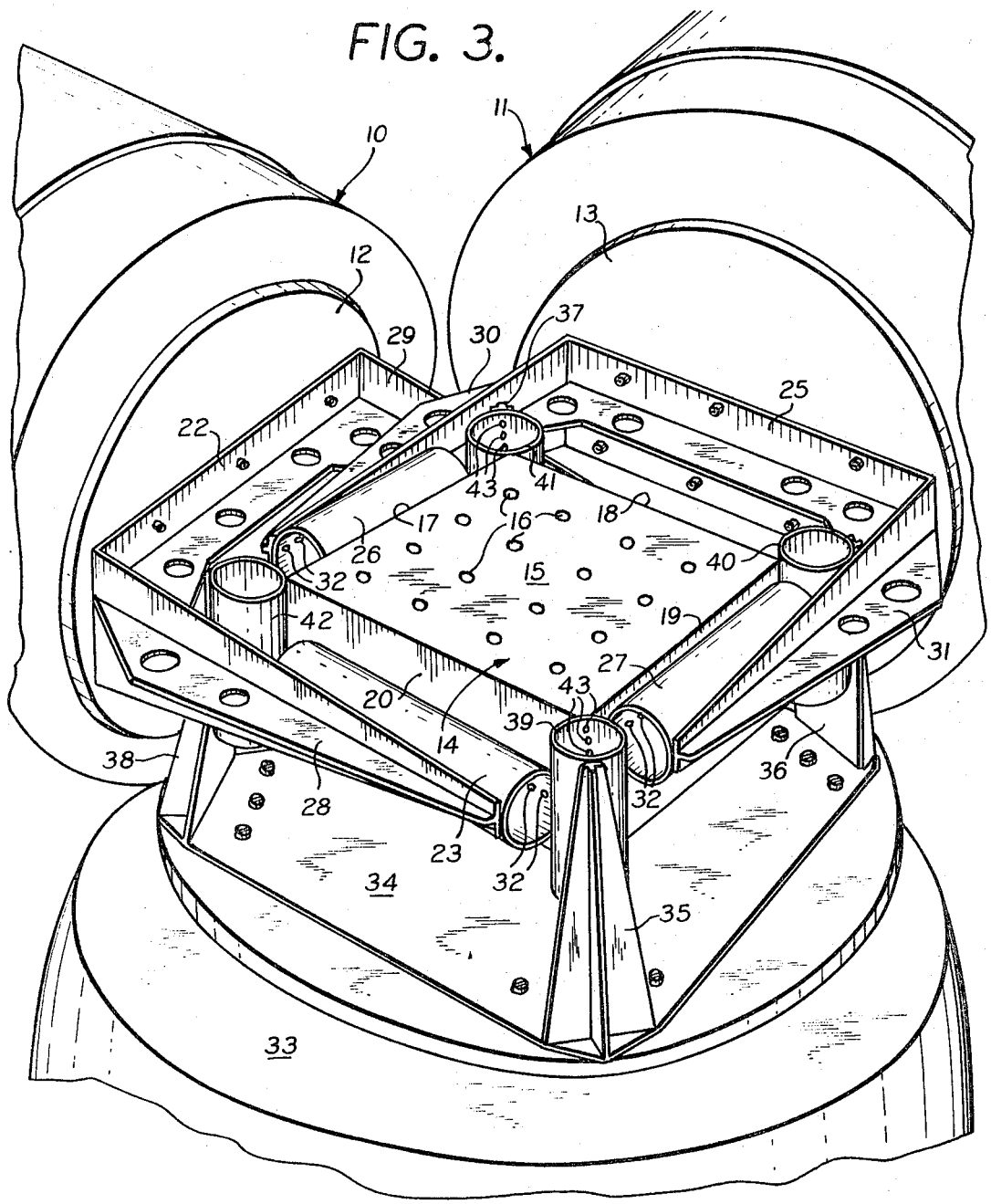
FIGURE 3 is a perspective view of a modification of the invention for coupling three exciters to a specimen.

In FIG. 3 there is shown a modification of the invention wherein a third exciter is added. The same reference numerals are used in this figure as in the previous figures to designate identical parts. The additional exciter is designated 33 and it is provided with a special mounting bracket 34 having four upstanding arms or structural beam members 35, 36, 37 and 38. These are located adjacent the vertical corners of the auxiliary table 14. The cylinders 39, 40, 41 and 42, of similar construction to the other cylinders, are sandwiched between the uprights or standards 35 to 38 and the auxiliary table. As shown, the corresponding cylinders are joined to both the arms and the table by rivets 43 in the same manner as the preceding cylinders. It should be apparent from a consideration of FIG. 3 that excitation by exciter 33 will result in the auxiliary table reciprocating in the up and down direction while the cylinders 23, 24, 26 and 27 tend to "roll" between the corresponding yoke arms and the auxiliary table. This represents a fairly compliant movement of the cylinders which offers negligible opposition to movement of the auxiliary table in the vertical direction. In similar manner, the cylinders 39, 40, 41 and 42 will tend to "roll" in a compliant manner when the auxiliary table is driven by either or both of the exciters 10 and 11.

It will be understood that the size of the compliant cylinders will depend upon the magnitude of the load to be driven and the ratings of the exciters employed. In the example set forth in this application it is contemplated that the cylinders will permit a displacement of ±.5 inch when employing pre-compression or pre-loading of the cylinders of approximately 0.75 inch.

The invention has been described with reference to two of the presently preferred embodiments thereof. Various changes in the detailed construction will occur to those skilled in the art without departing from the spirit of the invention as defined in the appended claims.

What is claimed is:

1. Apparatus for coupling a specimen to a plurality of vibration exciters whose excitation axes are related orthogonally comprising:
   an auxiliary table for mounting the specimen,
   at least two groups of two or more structural beam members, the members within a group being parallel and disposed around said auxiliary table, the longitudinal axes of the members in any group being related orthogonally to the longitudinal axes of the members in any other group,
   means for coupling each group of said beam members to a different vibration exciter for excitation along their respective longitudinal axes,
   and a separate thin walled cylinder sandwiched between each of said beam members and said auxiliary table, the axis of each of said cylinders being parallel to the longitudinal axis of the adjacent beam member, said cylinders being joined to both the auxiliary table and the corresponding beam member along the elements of the cylinder in contact therewith, the material and construction of said cylinders being such that each cylinder behaves as a rigid body for communicating movement between the beam member joined thereto and the auxiliary table for all movement in the direction of the cylinder axis, and behaves as a highly compliant flexible body in response to relative movement between the auxiliary table and the corresponding beam member in all other directions.

2. Apparatus for coupling a specimen to a plurality of vibration exciters whose excitation axes are related orthogonally comprising:
   an auxiliary table for mounting the specimen,
   at least two pairs of structural beam members, the members within a pair being parallel and disposed with said auxiliary table between them, the longitudinal axes of any pair being related orthogonally to the longitudinal axes of any other pair,
   means for coupling each pair of said beam members to a different vibration exciter for excitation along their respective longitudinal axes,
   and a separate thin walled cylinder sandwiched between each of said beam members and said auxiliary table, the axes of each of said cylinders being parallel to the longitudinal axis of the adjacent beam member, said cylinders being joined to both the auxiliary table and the corresponding beam member along the elements of the cylinder in contact therewith, the material and construction of said cylinders being such that each cylinder behaves as a rigid body for communicating movement between the beam member joined thereto and the auxiliary table for all movement in the direction of the cylinder axis, and behaves as a highly compliant flexible body in response to relative movement between the auxiliary table and the corresponding beam member in all other directions.

3. Apparatus for coupling a specimen to a plurality of vibration exciters whose excitation axes are related orthogonally comprising:
   an auxiliary table with a right parallelepiped configuration having a face for mounting the specimen and sides for connection to the exciters,
   a pair of yokes straddling the table in spaced apart planes parallel to said face, the axes of the yokes being related orthogonally, and the arms of the yokes being parallel to the corresponding sides of the table,
   means for coupling each yoke to a different vibration exciter for excitation along its respective axis,
   and a separate thin walled cylinder sandwiched between each yoke arm and the adjacent side of said table, the axis of each of said cylinders being parallel to the adjacent side of the table, said cylinders being joined to both the table and the corresponding yoke arm along the elements of the cylinder in contact therewith, the material and construction of said cylinders being such that each cylinder behaves as a rigid body for communicating movement between the yoke arm joined thereto and the table for all movement in the direction of the cylinder axis, and behaves as a highly compliant flexible body in response to relative movement between the table and the corresponding yoke arm in all other directions.

4. Apparatus for coupling a specimen to a vibration exciter comprising a table for mounting the specimen and a mechanical link for joining the table to the moving element of the exciter, said link including a rigid structural beam member and a thin walled cylinder sandwiched between the beam member and the table, said cylinder being joined to both the table and the beam member along longitudinal elements of the cylinder in contact with each, the material and construction of said cylinder being such that it behaves as a rigid body for communicating movement between the beam member and the table for all movement in the direction of the cylinder axis, and behaves as a highly compliant flexible body in response to relative movement between the table and the beam member in all other directions.

5. Apparatus according to claim 4, wherein the thin walled cylinder consists of a plural layer roll of thin sheet metal, adjacent layers being joined together along said longitudinal elements which are in contact with said table and beam member.

6. Apparatus for coupling a specimen to a plurality of vibration exciters whose excitation axes are related orthogonally comprising:
   an auxiliary table for mounting the specimen,
   at least two groups of two or more structural beam members, the members within a group being parallel and disposed around said auxiliary table, the longitudinal axes of the members in any group being related orthogonally to the longitudinal axes of the members in any other group,
   means for coupling each group of said beam members to a different vibration exciter for excitation along their respective longitudinal axes, and a separate thin walled cylinder sandwiched between each of said beam members and said auxiliary table, the axis of each of said cylinders being parallel to the longitudinal axis of the adjacent beam member, said cylinders being joined to both the auxiliary table and the corresponding beam member by fastening means passing through the wall of the cylinder along the elements of the cylinder in contact therewith, said cylinders each consisting of a plural layer roll of thin sheet metal with adjacent layers being joined together by said fastening means such that each cylinder behaves as a rigid body for communicating movement between the beam member joined thereto and the auxiliary table for all movement in the direction of the cylinder axis, and behaves as a highly compliant flexible body in response to relative movement between the auxiliary table and the corresponding beam member in all other directions.

References Cited by the Examiner

UNITED STATES PATENTS 2,439,219  4/1948  O'Connor.
3,049,913  8/1962  Hunt _____ 73—71.6

RICHARD C. QUEISSER, *Primary Examiner.*

J. J. GILL, *Assistant Examiner.*